C. WALTERS.
Cotton-Seed Planters.

No. 154,732. Patented Sept. 1, 1874.

WITNESSES:
Jas. E. Hutchinson
John R. Young

INVENTOR:
C. Walters, by
Prindle and Deane, his
attorneys

2 Sheets--Sheet 2.

C. WALTERS.
Cotton-Seed Planters.

No. 154,732. Patented Sept. 1, 1874.

WITNESSES:
Jas. E. Hutchinson
John R. Young

INVENTOR:
C. Walters, by
Prindle and Deam, his Attorneys

UNITED STATES PATENT OFFICE.

CHRISTIAN WALTERS, OF POWHATAN, OHIO.

IMPROVEMENT IN COTTON-SEED PLANTERS.

Specification forming part of Letters Patent No. 154,732, dated September 1, 1874; application filed April 15, 1874.

*To all whom it may concern:*

Be it known that I, C. WALTERS, of Powhatan, in the county of Belmont and in the State of Ohio, have invented certain new and useful Improvements in Cotton-Seed Planters; and do hereby declare that the following is a full, clear, and exact description thereof, reference being had to the accompanying drawings, making a part of this specification, in which—

Figure 1:
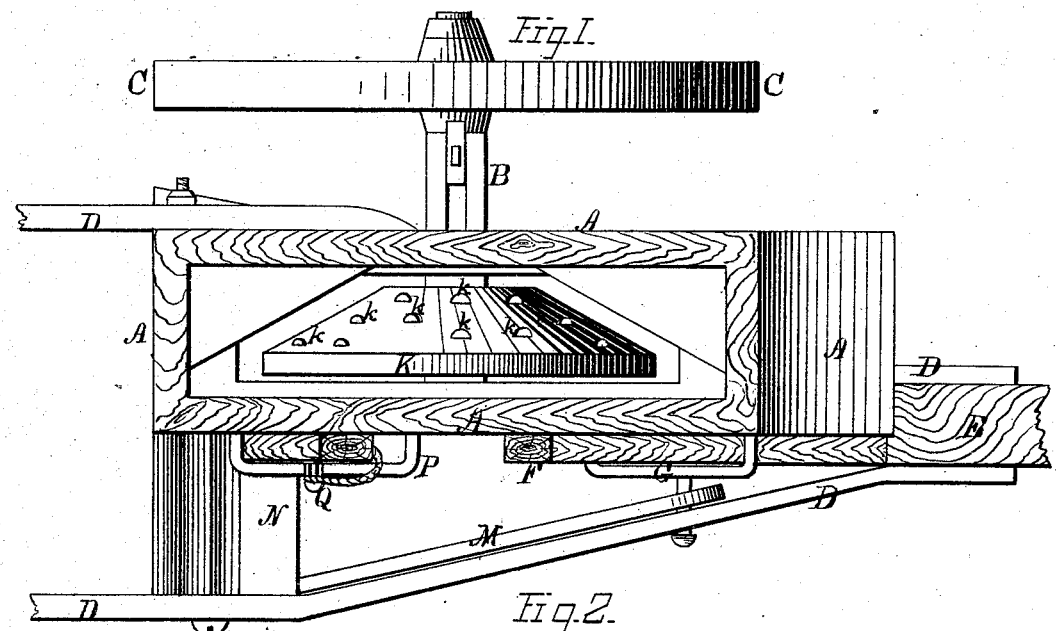
Figure 2:
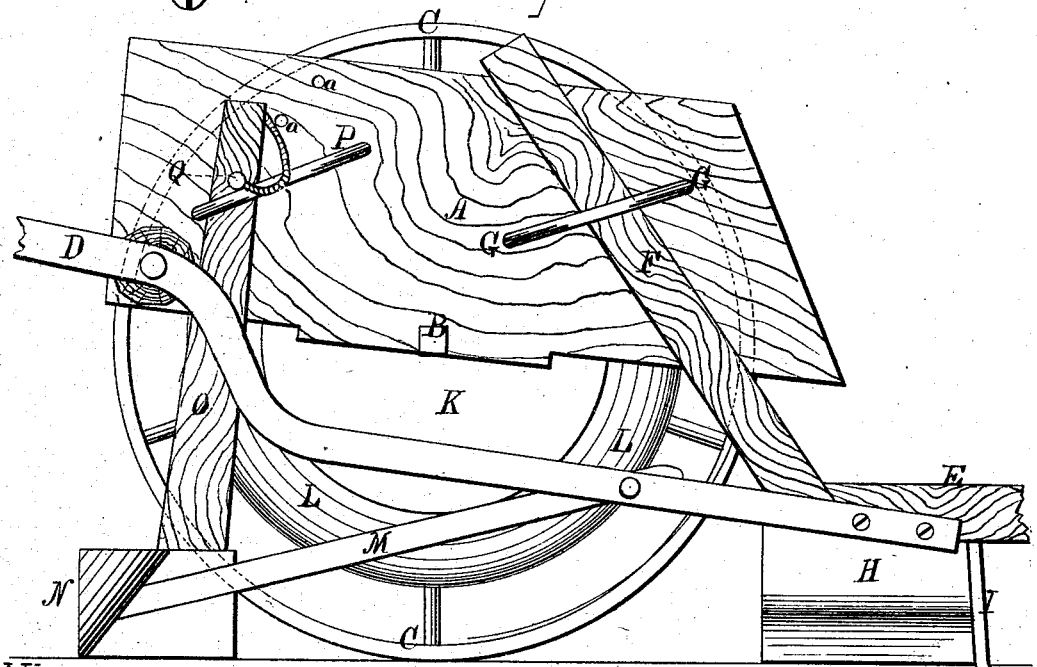
Figure 3:
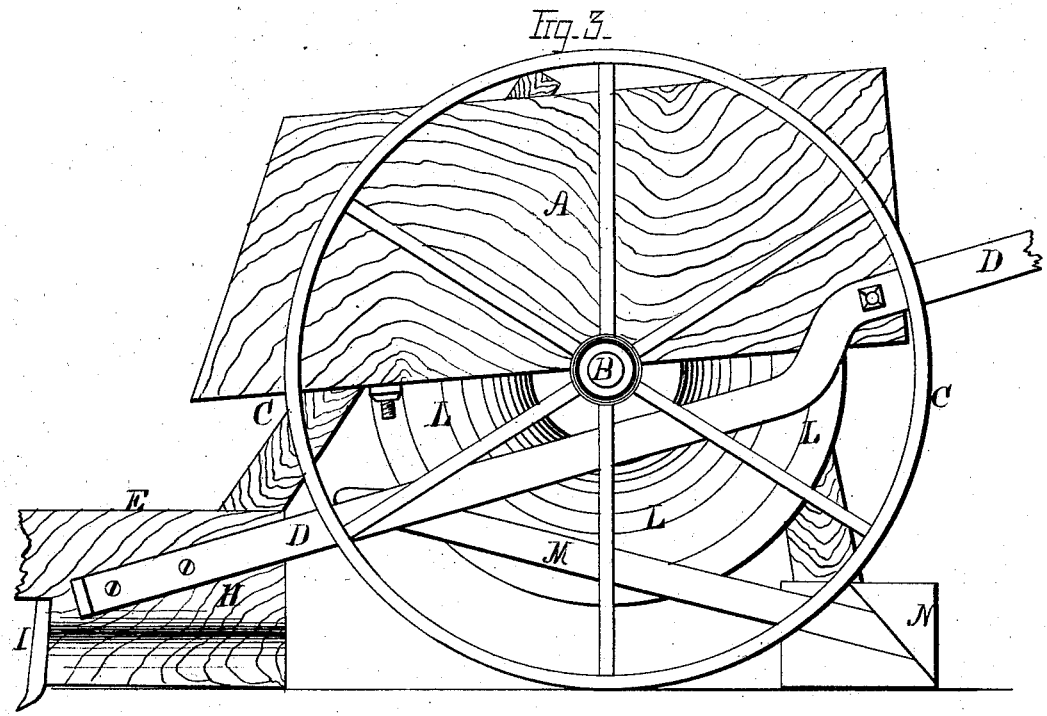
Figure 4:
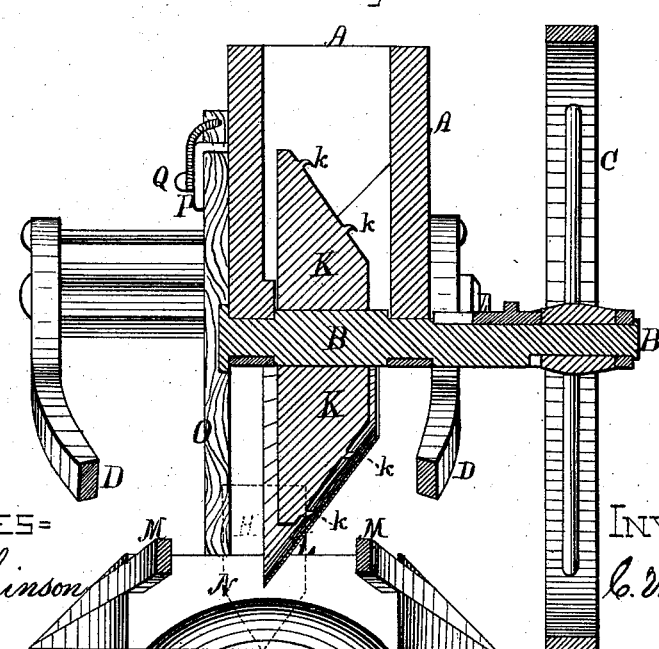

Figure 1 is a plan view of the upper side of my improved machine. Figs. 2 and 3 are elevations of opposite sides of the same, and Fig. 4 is a vertical cross-section upon a line with the center of the axle.

Letters of like name and kind refer to like parts in each of the figures.

The design of my invention is to enable cotton and other like seeds to be planted and covered at one operation; and it consists, principally, in the peculiar construction of the disk or wheel which constitutes the seed-dropper, substantially as is hereinafter shown. It consists, finally, in the construction and combination of the various parts of the machine, substantially as and for the purposes hereinafter set forth.

In the annexed drawings, A represents a seed-box or hopper, which has, preferably, a rectangular shape in plan view, and at its lower side and longitudinal center has journaled an axle, B, that has attached to one or both of its ends a ground or traction wheel, C, of usual form. Pivoted at some distance in front of their rear ends to or upon the rear end of the box A are two handles, D and D, which are suitably connected together laterally, and extending forward, downward, and inward are secured at their front ends to or upon the rear end of a beam or pole, E. From the rear end of said beam E a standard, F, extends upward and rearward, as shown, one-half of its thickness being removed, so as to form a shoulder or bearing upon its inner side, upon which the lower side of said box rests, while the outer portion of said standard extends upward alongside of said box, and is loosely confined in place by means of a metal strap, G. Upon the lower side of the beam E is secured a wedge-shaped block, H, (shown in dotted lines in Fig. 4,) which extends from the rear end of said beam forward to a point near the front ends of the handles D and D, and immediately in rear of a shovel or colter, I, that is secured within and extends downward from said beam, said devices being used for the purpose of opening a furrow for the reception of seed.

To drop or plant the seed a circular disk, K, having one plane and one conical side, is secured to or upon the axle B within the space inclosed by the sides of the box A, the bottom of said box being removed upon lines parallel to those of said disk, so as to enable the latter to revolve freely within the opening thus formed. Upon the conical face of the disk K are provided a series of teeth or projections, k, which engage with seed contained within the box or hopper A, and carry the same forward and downward through an opening left between the front portion of said disk and the adjacent portion of the bottom, after which said seed fall to the ground. In order to better control the downward passage of the seed and guide the same into the furrow, a metal shield, L, corresponding in shape to the lower half and conical face of the disk or dropper K, is secured to or upon the lower side of the box A, and extends downward alongside of said dropper, the distance between their contiguous faces being sufficient only for the passage of seed between the same.

After having been deposited within the furrow, the seed are covered by means of the following-described mechanism: Two bars, M and M, are pivoted at their front ends to or within the handles D and D, just in rear of the beam E, and extending rearward and apart are connected at their rear ends to or with the ends of a beam, N, that extends horizontally and transversely between said bars. The lower face of the beam or coverer N is hollowed out from its rear side forward and upward, so that when drawn over the upturned soil the latter shall be forced inward and downward into the furrow. The coverer N is held in vertical position by means of a bar, O, that is secured to its upper side, and from thence extends upward and slightly forward beside the box A. A strap, P, holds said bar O in lateral position against the box A, while a pin, Q, passes inward through said bar and into one of a series of openings, a, formed within said box, such arrangement enabling the vertical position of the coverer to be changed at will.

The device thus constructed affords a simple, cheap, and efficient means whereby cotton or other like seed can be evenly planted at a uniform depth within the ground, and afterward as thoroughly and effectually covered as by hand, the operations of furrowing the ground, dropping the seed, and covering the same requiring no more time and but little more power than would either singly.

Having thus fully set forth the nature and merits of my invention, what I claim as new is—

1. In a seed-planter, the seed-box A, axle B, and dropper K, having projections $k$ upon its conical face or side, and shield L, all constructed, combined, and operating in the manner set forth.

2. The seed-box A, axle B, ground or traction-wheel C, beam E, standard F, staple G, block H, colter I, dropper K $k$, shield L, and coverer N, the said parts being constructed and combined to operate in the manner and for the purpose substantially as specified.

In testimony that I claim the foregoing I have hereunto set my hand this 13th day of April, 1874.

CHRISTIAN WALTERS.

Witnesses:
 WILLIAM BRAST,
 AUGUSTUS BRAST.